July 14, 1942.    A. G. DREYER    2,289,877
DEVICE FOR DISPLAYING AND DEMONSTRATING AIRCRAFT FLIGHTS
Filed July 3, 1940    3 Sheets-Sheet 1
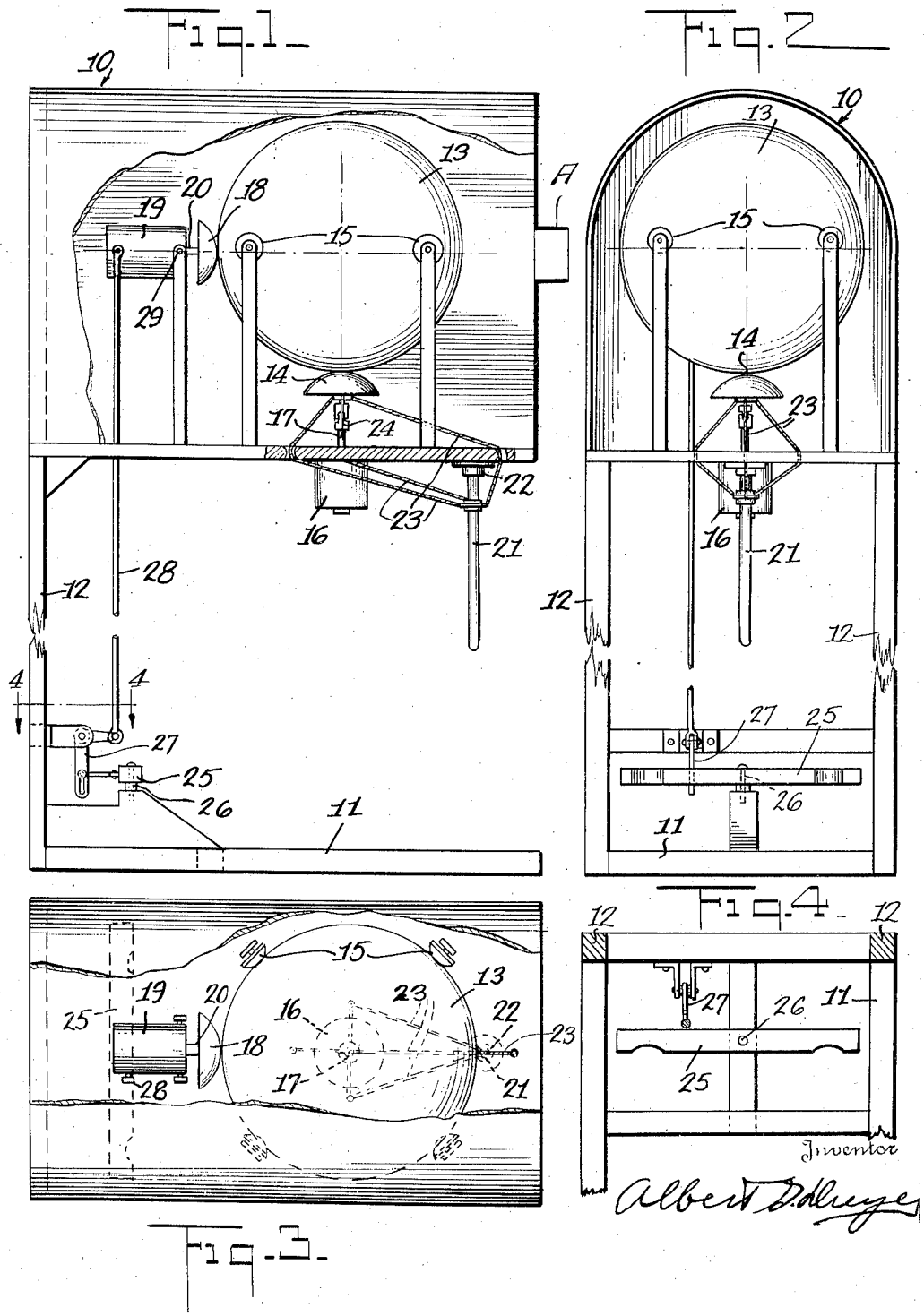

July 14, 1942.  A. G. DREYER  2,289,877
DEVICE FOR DISPLAYING AND DEMONSTRATING AIRCRAFT FLIGHTS
Filed July 3, 1940  3 Sheets-Sheet 2
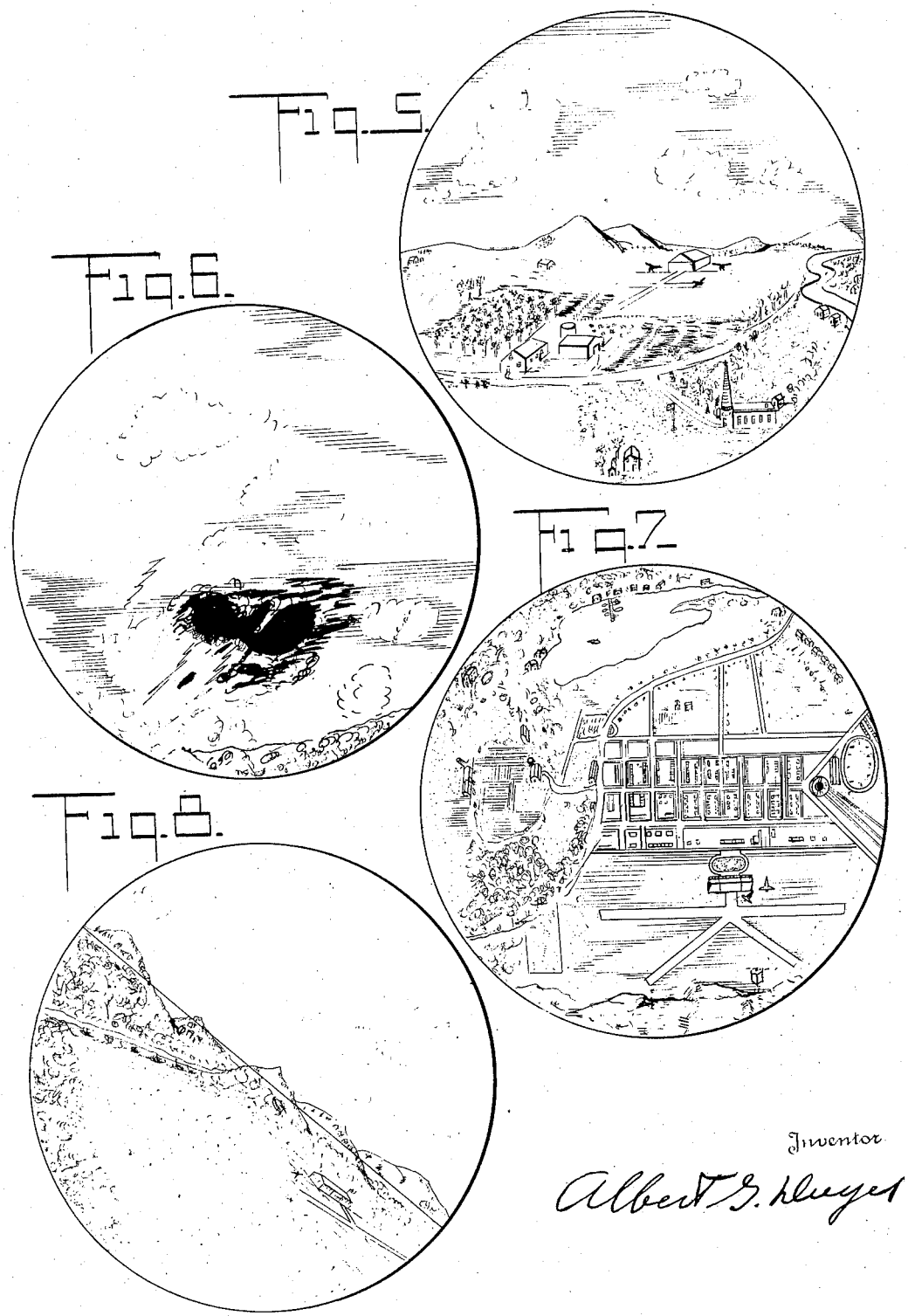
Inventor
Albert G. Dreyer July 14, 1942.                A. G. DREYER                    2,289,877
          DEVICE FOR DISPLAYING AND DEMONSTRATING AIRCRAFT FLIGHTS
                    Filed July 3, 1940         3 Sheets-Sheet 3
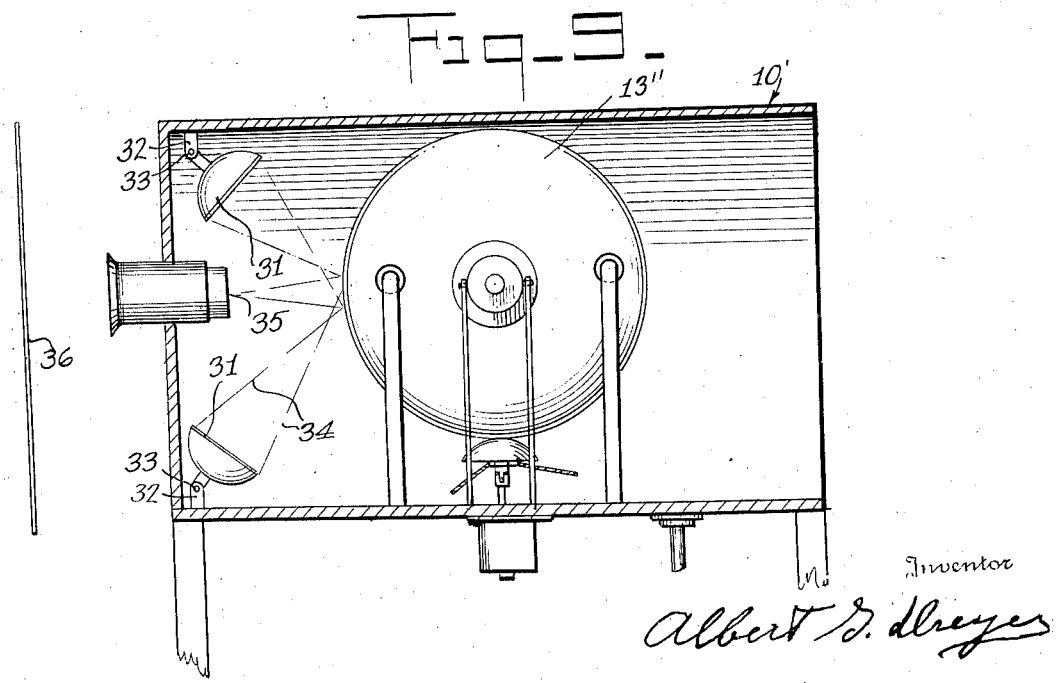

Patented July 14, 1942

2,289,877

UNITED STATES PATENT OFFICE 2,289,877

DEVICE FOR DISPLAYING AND DEMONSTRATING AIRCRAFT FLIGHTS

Albert G. Dreyer, Elizabeth, N. J., assignor to Roto-Drive, Inc., a corporation of New Jersey Application July 3, 1940, Serial No. 343,878

9 Claims. (Cl. 35—12)

This invention relates to improvements in devices for simulating and demonstrating flights of aircraft and the like and while it is generally applicable to aircraft flights and maneuvers it may be used for educational, amusement and other purposes.

One important object of the invention is to universally rotate or revolve, within a cabinet, a pictorial sphere designed to represent the sky, earth and horizon in such a manner as to convey to an observer viewing the said sphere through an aperture or opening in said cabinet, wherein the field of vision is limited, the optical illusion of riding in an aircraft.

Another object of my invention is to control the operation or motion of such a sphere by conventional controls such as are actually used in the operation of an airplane so as to coordinate and synchronize the movements of said controls with corresponding movements of the said sphere.

Another object of my invention is to universally rotate or revolve a transparent sphere with a miniature airplane suspended therein and to cause such miniature airplane to perform gyrations and other desired movements in response to the operation of conventional controls such as are actually used in the operation of aircraft and to project images thereof upon a screen.

Still another object of my invention is to project a reflected image of the landscape or terrain of the surface depicted on said sphere upon an appropriate screen.

With these objects and ends in view the invention embraces primarily a jig comprised of a cabinet which may be readily mounted on a pedestal or other suitable support, a sphere or globe movably suspended or retained within said cabinet, a means of rotating said sphere or globe universally, appropriate controls for the operation of said sphere or globe as desired and other new and novel details of construction and combination of parts hereinafter fully described in the accompanying drawings and specifically claimed.

In the accompanying drawings like characters of reference indicate like parts in the several views:

Figure 1 is a side elevational view partly in section of the device.

Figure 2 is a frontal elevational view as shown in Figure 1.

Figure 3 is a plan view with cover broken away to show sphere.

Figure 4 is a sectional view taken on line 4—4 of Figure 1.

Figure 5 is a pictorial view showing a territorial scene as viewed from an altitude of approximately three thousand feet.

Figure 6 is a pictorial view of the upper half of the sphere or sky depicted above the horizon line as viewed from a plane climbing vertically.

Figure 7 is an underneath view of the pictorial sphere as viewed by an aviator directly above.

Figure 8 is a scene as viewed from an airplane making a left bank.

Figure 9 is a diagrammatical sectional elevational view of my invention showing a reflectory device for lighting and projecting views of the surface of said pictorial sphere upon a canvas or other suitable surface.

In the embodiment of the invention as here disclosed there is shown a cabinet 10, a base 11, and vertical supports 12, elevating said cabinet directly over said base. Within said cabinet there is floatingly mounted a sphere 13 gravitationally engaging a vertical dome shaped rotatable member, 14, which is driven by motor 16 by means of a shaft 17, said sphere being retained in position by means of bearing guides, 15, placed at quarter positions around and slightly above the center line of said sphere.

On a vertical plane, and at right angles to the vertical roto-drive 14, is placed a second horizontal roto-drive 18, driven by motor 19, by means of the shaft 20. Mounted underneath the cabinet 10 at a convenient position for the operator and extending downward is a joy stick 21 pivoted at 22 to permit of universal movement, and extending from quarter positions around the base of said joy stick 21, to corresponding quarter positions around the base of the roto-drive 14, are four control cables 23. In the shaft 17 of said roto-drive 14 is placed a universal joint 24 permitting of universal movement of the driving head of roto-drive 14 by means of the universal operation of the joy stick 21.

Upon the base of the device at the rear thereof and within easy reach of the feet of the operator is attached a rudder bar 25, pivoted at 26, to which is attached a bell crank 27 which is connected with the vertical rod 28 attached to motor assembly 19 which is pivoted at 29 to admit of a vertical movement of roto-drive 18 up or down as desired by means of a corresponding movement of the rudder bar.

The construction and operation will be readily understood from the following description. The operator takes a convenient position, preferably seated in front of the jig, within reach of the joy-stick and rudder bar, and peers through an aperture A in the front of the cabinet which confines his vision to a limited portion of the sphere. By means of a convenient switch the motors are started thus causing the roto-drives to rotate. By operation of the joy stick the vertical roto-drive may be thrown off center or neutral position and the larger circumferences of the said roto-drive may be selectively brought in contact with the sphere thus causing said sphere to rotate upon a horizontal axis and at variable speeds depending upon the angle or pitch of said roto-drive from its normal or neutral position and reversing the rotation of said sphere accordingly as said roto-drive is swung from one side across center to the other side thereof or vice versa, said horizontal axis of the rotating sphere rotating on the same plane accordingly as said roto-drive is caused to transcribe a circular path. It will be seen also that by operation of the rudder bar the horizontal roto-drive will swing upward or downward from its neutral position and that said sphere will be caused to rotate upon a vertical axis the speed of rotation being varied according to the pitch or angle of said horizontal roto-drive, and the rotation of said sphere being reversed accordingly as said roto-drive is swung upward or downward across center. Thus it will be seen that each roto-drive operated independently will cause the sphere to perform differently and that by operating both roto-drives simultaneously that the sphere will perform a compound motion operating upon two independent axes at the same time, each or both of which axes may be caused to change position resulting in an infinite variety of movements of said sphere at the will of the operator simulating views and movements as experienced from an airplane in flight in taking off, in climbing, in performing loops, barrel rolls and nose dives and in landing.

While in the foregoing there has been shown and described the preferred embodiment of this invention, it is to be understood that minor changes may be made in the form and construction of the invention without departing from the spirit thereof.

Having thus described the invention, what is claimed as new is:

1. In a device for displaying and demonstrating aircraft flights, a globe, the surface thereof bearing indicia representing terrestrial objects, sky, clouds, and a horizon line.

2. In a device for displaying and demonstrating aircraft flights, a globe, the surface thereof divided into hemispheres, one of such hemispheres bearing indicia representing terrestrial objects; the other of such hemispheres bearing indicia representing sky, clouds and celestial objects and a line representing the horizon extending between said hemispheres so depicted.

3. In a device for displaying and demonstrating aircraft flights, a globe, the surface thereof divided into hemispheres; one of said hemispheres bearing indicia representing terrestrial objects, said hemisphere being divided into one or more zones the objects depicted in each of said zones being in relative perspective as viewed from a point directly over the pole of said hemisphere; the other of such hemispheres bearing indicia representing sky, clouds, and celestial objects and a line representing the horizon extending between said hemispheres as depicted.

4. In a device for displaying and demonstrating aircraft flights, a globe, mounted for universal rotation, restrained against movement of translation, the surface thereof depicting one or more different scenes; manually controlled means for universally rotating said globe; means for projecting upon a screen reflected images of one or more of said scenes during the rotation of said globe.

5. In a device for displaying and demonstrating aircraft flights, a rotatable friction driving member embracing a spherical driving head, a shaft attached to the center thereof projecting from the plane surface thereof and perpendicular thereto and a universal joint in said shaft at a point coinciding with the radial center of said spherical driving head.

6. In a device for displaying and demonstrating aircraft flights, in combination with a driving member such as described in claim 5, a globe mounted for universal rotation, restrained against movement of translation, tangent to the driving head of said driving member and resting frictionally thereon; a second rotatable friction driving member such as described in claim 5 tangent to said globe and frictionally engaging said globe at a point 90 degrees from the point of contact of the first described rotatable friction driving member; a means of selectively rotating said driving members and a means of selectively shifting the positions of the driving heads of said driving members respectively at any angle and radial point within the compass of each of the universal joints of the said driving members respectively.

7. In a device for displaying and demonstrating aircraft flights, in combination, a globe, the surface thereof bearing indicia representing terrestrial objects, sky, clouds and a horizon line; a cabinet with a dark opaque interior within which said globe is mounted for universal rotation, restrained against movement of translation; means of universally rotating said globe; means of illuminating the interior of said cabinet and one or more apertures whereby observers from positions without said cabinet may view the interior thereof.

8. In a device for displaying and demonstrating aircraft flights, in combination, a globe, the surface thereof bearing indicia representing terrestrial objects, sky, clouds and a horizon line; a cabinet with a dark opaque interior within which said globe is mounted for universal rotation, restrained against movement of translation; means for projecting upon a screen reflected images of one or more of the scenes depicted upon the surface of said globe; means for universally rotating said globe; a joystick and a rudder bar conventionally mounted exterior to said cabinet and a means of connecting said joystick and rudder bar each with one of the frictional driving members described in claim 6.

9. In a device for displaying and demonstrating aircraft flights, a globe, the surface thereof depicting different scenes, mounted for universal rotation, restrained against movement of translation; manually controlled means for varying the speed and direction of rotation of said globe; a screen and means for projecting upon said screen reflected images of different portions of the surface of said globe during the rotation thereof.

ALBERT G. DREYER.